(12) United States Patent
Martin et al.

(10) Patent No.: US 10,767,607 B2
(45) Date of Patent: Sep. 8, 2020

(54) FILTER ASSEMBLY FOR A FRESH AIR FILTRATION SYSTEM, FRESH AIR FILTRATION SYSTEM MADE THEREWITH, AND METHOD OF FILTERING FRESH AIR

(71) Applicants: Jeffrey Martin, St. Clair Shores, MI (US); Gary Zelinski, Sterling Heights, MI (US); William Boike, Warren, MI (US); Rick McQuiston, Warren, MI (US)

(72) Inventors: Jeffrey Martin, St. Clair Shores, MI (US); Gary Zelinski, Sterling Heights, MI (US); William Boike, Warren, MI (US); Rick McQuiston, Warren, MI (US)

(73) Assignee: Fluid Routing Solutions, LLC, Madison Heights, MI (US)

( * ) Notice: Subject to any disclaimer, the term of this patent is extended or adjusted under 35 U.S.C. 154(b) by 241 days.

(21) Appl. No.: 15/992,545

(22) Filed: May 30, 2018

(65) Prior Publication Data

US 2018/0347518 A1 Dec. 6, 2018

Related U.S. Application Data

(60) Provisional application No. 62/515,119, filed on Jun. 5, 2017.

(51) Int. Cl.
*F02M 35/024* (2006.01)
*B01D 46/00* (2006.01)
*B01D 46/10* (2006.01)

(52) U.S. Cl.
CPC ..... *F02M 35/02425* (2013.01); *B01D 46/002* (2013.01); *F02M 35/02433* (2013.01); *F02M 35/02441* (2013.01); *F02M 35/02491* (2013.01); *B01D 46/001* (2013.01); *B01D 46/0005* (2013.01); *B01D 46/106* (2013.01)

(58) Field of Classification Search
CPC .......................... B01D 46/002; B01D 46/106; B01D 46/0005; B01D 46/001; B01D 46/4227; B01D 46/0008; B01D 2258/06; F02M 35/02425; F02M 35/02441; F02M 35/02433; F02M 35/02491
USPC ................. 55/418, 385.1; 96/121, 131, 152; 123/519
See application file for complete search history.

(56) References Cited

U.S. PATENT DOCUMENTS

| | | |
|---|---|---|
| 2,603,308 A | 7/1952 | McCall |
| 3,683,597 A | 8/1972 | Beveridge et al. |
| 3,728,846 A | 4/1973 | Nilsson |
| 4,338,106 A | 7/1982 | Mizuno et al. |
| 4,350,509 A | 9/1982 | Alseth et al. |
| 4,388,086 A | 6/1983 | Bauer et al. |
| 4,504,289 A | 3/1985 | Waller |
| 4,548,624 A | 10/1985 | Waller |

(Continued)

*Primary Examiner* — Minh Chau T Pham
(74) *Attorney, Agent, or Firm* — Fay Sharpe LLP (57) ABSTRACT

A filter assembly for a fresh air filtration system, the fresh air filtration system made therewith, and a method of filtering fresh air are provided. The filter assembly includes a filter housing and at least one filter element supported within the housing, the housing having at least one inlet for receiving a fluid to be filtered and at least one outlet for discharging filtered fluid, wherein the at least one inlet and at least one outlet are on a common side of the housing.

14 Claims, 6 Drawing Sheets

(56) References Cited

U.S. PATENT DOCUMENTS

| | | |
|---|---|---|
| 4,632,682 A | 12/1986 | Erdmannsdorfer |
| 4,694,267 A | 9/1987 | Guill et al. |
| 4,703,736 A | 11/1987 | Atkins, Sr. |
| 4,848,989 A | 7/1989 | Maeda |
| 5,024,687 A | 6/1991 | Waller |
| 5,058,693 A | 10/1991 | Murdock et al. |
| 5,112,372 A | 5/1992 | Boeckermann et al. |
| 5,119,791 A | 6/1992 | Gifford et al. |
| 5,575,832 A | 11/1996 | Boyd |
| 5,685,985 A * | 11/1997 | Brown ............... B01D 29/21 210/450 |
| 5,776,568 A * | 7/1998 | Andress ........... B01D 53/0415 428/35.7 |
| 5,919,279 A | 7/1999 | Merritt et al. |
| 5,935,281 A | 8/1999 | Rotheiser et al. |
| 6,383,268 B2 | 5/2002 | Oda |
| 7,143,751 B2 | 12/2006 | Sung |
| 7,294,179 B2 * | 11/2007 | Kim ................ B01D 53/0415 123/519 |
| 7,597,745 B2 * | 10/2009 | Lebowitz ............... B01D 53/02 55/385.3 |
| 7,981,182 B2 * | 7/2011 | Volchko ............... F02D 33/003 210/320 |
| 8,057,567 B2 | 11/2011 | Webb et al. |
| 8,062,397 B2 | 11/2011 | Lin et al. |
| 8,132,559 B2 | 3/2012 | Dong et al. |
| 8,613,786 B2 * | 12/2013 | Krull .................... B01D 27/08 55/498 |
| 9,371,804 B2 | 6/2016 | Leonard et al. |
| 2005/0050864 A1 * | 3/2005 | Oh ...................... A47L 9/1641 55/345 |
| 2005/0172586 A1 * | 8/2005 | Oh ...................... A47L 9/1625 55/345 |
| 2008/0223343 A1 | 9/2008 | Ammermann |
| 2008/0251055 A1 | 10/2008 | Schmalz et al. |
| 2015/0369182 A1 * | 12/2015 | Steinman .......... B01D 46/2403 55/309 |
| 2016/0146160 A1 | 5/2016 | Lee |
| 2019/0063379 A1 * | 2/2019 | Labadie ............ F02M 35/02408 |
| 2019/0186425 A1 * | 6/2019 | Kagau ................... B01D 53/02 |

\* cited by examiner

FILTER ASSEMBLY FOR A FRESH AIR FILTRATION SYSTEM, FRESH AIR FILTRATION SYSTEM MADE THEREWITH, AND METHOD OF FILTERING FRESH AIR

CROSS REFERENCE TO RELATED PATENTS AND APPLICATIONS

This application claims priority to and the benefit of the filing date of U.S. Provisional Patent Application Ser. No. 62/515,119, filed Jun. 5, 2017, which application is hereby incorporated by reference.

BACKGROUND

The present disclosure relates to a filter assembly. It finds particular application in conjunction with systems and methods for supplying purge air in a fuel vapor recovery system and will be described with particular reference thereto. However, it is to be appreciated that the present exemplary embodiment is also amenable to other like applications.

Fuel vapor recovery systems are utilized to reduce vehicle emissions. Such systems generally include a vapor storage canister for receiving and storing fuel vapors generated in a fuel tank of the vehicle. The vapor storage canister houses an absorbent for retaining fuel vapors displaced during refueling, or during other times (e.g., due to thermal fuel expansion). A purge line connects the vapor storage canister to an intake manifold of the vehicle. A purge vent line (also sometimes referred to as a fresh air line) provides fresh air to the canister during purging of the canister. A purge line valve and a purge vent valve are both typically controlled by an onboard computer to purge the vapor storage canister in accordance with a predetermined routine by opening a flow path from the purge vent line through the vapor storage canister to an intake manifold of the vehicle.

Accordingly, the fuel vapors stored in the vapor storage canister are purged into the intake manifold of the vehicle's engine to be burned in the combustion chamber(s) of the engine. The purge process generally includes opening the purge valve and purge vent valve to allow the vacuum pressure in the intake manifold to draw the vapors from the vapor storage canister into the intake manifold.

Some purge vent lines include an air filter for removing contaminants such as moisture and dust from the air before it is utilized to purge the vapor storage canister. However, the air filters known in the art are bulky and are expensive to manufacture.

SUMMARY

In accordance with one aspect of the present disclosure, a filter assembly comprises a filter housing and at least one filter element supported within the housing, the housing having at least one inlet for receiving a fluid to be filtered and at least one outlet for discharging filtered fluid, wherein the at least one inlet and at least one outlet are on a common side of the housing.

The housing can include a base portion and a connector cap portion releasably coupled to the base portion, the base portion and the connector cap portion defining a chamber. The connector cap portion can have a central passageway including a cylindrically-shaped portion extending into the chamber, and a plurality of openings adjacent the central passageway, and the at least one filter element can be supported in the chamber such that fluid flows between the central passageway and the plurality of openings via the at least one filter element. The at least one filter element can be at least partially supported on the cylindrically-shaped portion of the connector cap portion. The assembly can further include a second filter element at least partially supported on the cylindrically-shaped portion of the connector cap portion, whereby fluid is drawn into the chamber via the plurality of openings and passes through the first and second filter elements before being discharged from the chamber via the central passageway. The connector cap portion can include at least one tab configured to cooperate with at least one corresponding retaining barb of the base portion for securing the connector cap portion to the base portion. The first and second filter elements can be spaced apart from a bottom of the base portion. The first and second filter elements can be coextensive with the cylindrically-shaped portion of the connector cap portion. The first filter element can have twenty-five pores per inch and the second filter element can have sixty pores per inch. The plurality of openings can include at least one rectangular-shape opening and at least one circular-shape opening. The first and second filter elements can be fixed relative to the connector cap portion by one or more ribs formed on an inner surface of the base portion.

In accordance with another aspect, a fresh air filtration system comprises a filter assembly at least in part as set forth above, and a fresh air line coupled to the filter assembly for supplying filtered air to an associated component.

In accordance with another aspect, a method of filtering fresh air comprises providing filter assembly including a filter housing and at least one filter element supported within the housing, the housing having at least one inlet for receiving air to be filtered and at least one outlet for discharging filtered air, wherein the at least one inlet and at least one outlet are on a common side of the housing, and causing air to flow between the inlet and the outlet through the at least one filter element, whereby air exiting the outlet is filtered.

BRIEF DESCRIPTION OF THE DRAWINGS

The above, as well as other advantages of the present disclosure will become readily apparent to those skilled in the art from the following detailed description when considered in the light of the accompanying drawings in which.

DETAILED DESCRIPTION

It is to be understood that the embodiments disclosed may assume various alternative orientations and step sequences, except where expressly specified to the contrary. It is also to be understood that the specific assemblies, systems, methods, and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements found in the aforementioned embodiments may be referred to with like identifiers within this section of the application.

Figure 1:
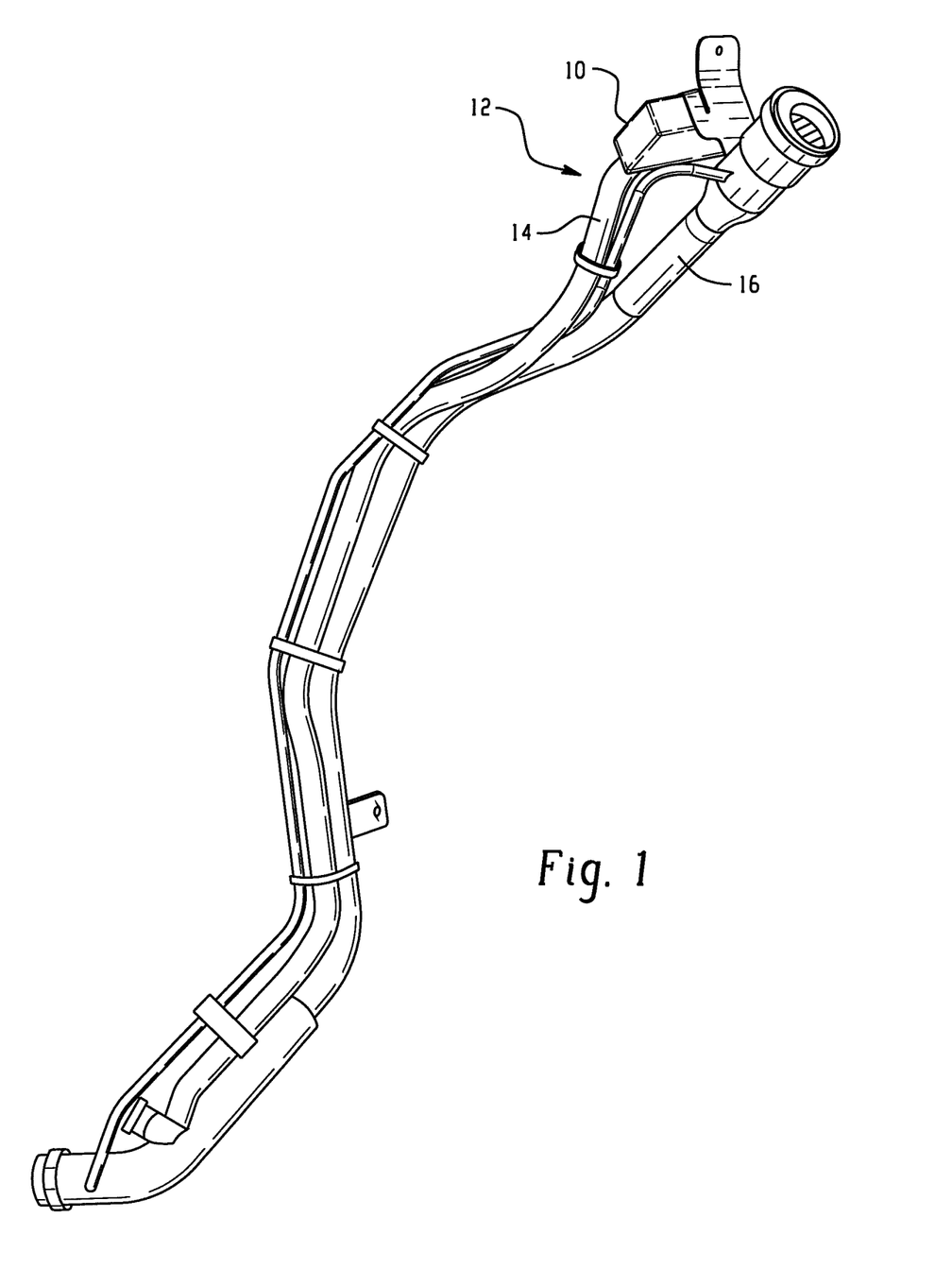
FIG. 1 is a perspective view of a portion of an embodiment of a fresh air filtration system including a filter assembly in accordance with the present disclosure.
Figure 2:
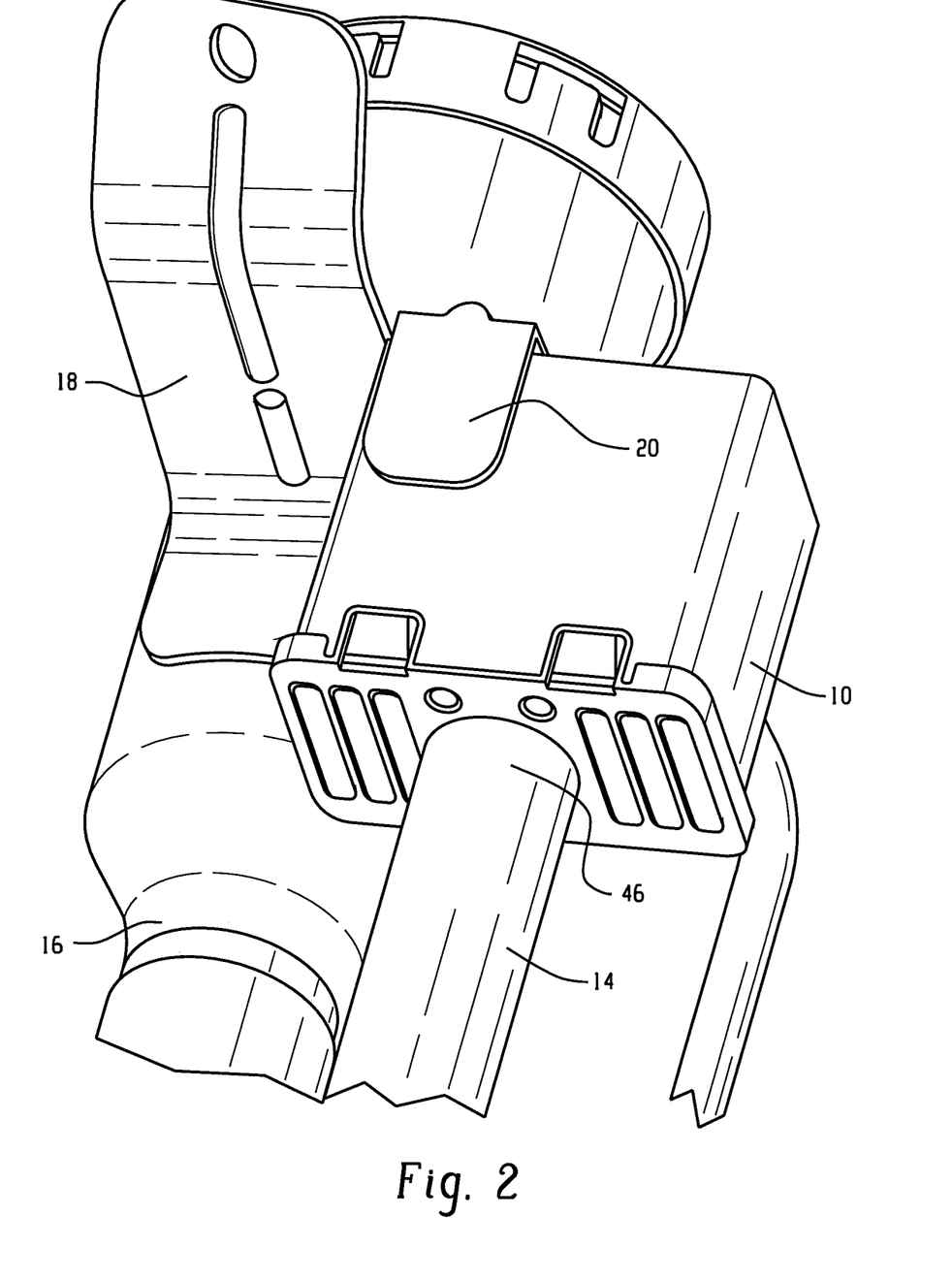
FIG. 2 is an enlarged top perspective view of a portion of the fresh air filtration system of FIG. 1.

Embodiments of a filter assembly 10 are illustrated in FIGS. 1-9. Preferably, when in use, the filter assembly 10 is provided as a portion of a fresh air filtration system 12, such as may be used in connection with a purge vent line for a fuel vapor recovery system. Referring now to FIG. 1, the fresh air filtration system 12 further includes a fresh air line 14. The fresh air line 14 extends toward and is attached to a vapor storage canister (not depicted). The filter assembly 10 is located adjacent a fuel filling area of the vehicle and adjacent the top of a fuel filler pipe 16.

The filter assembly 10 is positioned adjacent the fuel filler pipe 16 for attachment thereto. The fuel filler pipe 16 extends towards and is attached to the fuel tank (not depicted). As illustrated best in FIG. 2, the filter assembly 10 is attached to the fuel filler pipe 14 via a bracket 18. A clip 20 may be provided on the bracket 18 so that the filter assembly 10 can be attached to the filler pipe 16. In this embodiment, the filter assembly 10 is attached to the filler pipe 16 by pressing the clip 20 into a hole 22, shown best in FIG. 3, in the filter assembly 10. Preferably, the hole 22 is formed in a sidewall of the filter assembly 10.

Referring now to FIGS. 3-8, the filter assembly 10 comprises a housing 24. The housing 24 may be formed from a rigid or semi-rigid material such as a plastic, metal, ceramic, or a composite of materials. However, the housing 24 may be formed from one or more materials not specifically mentioned above.

The housing 24 may be formed in a unitary manner. However, in an embodiment, the housing 24 comprises separate portions. In one such embodiment, a connector cap portion 26 and a base portion 28 are provided. The connector cap portion 26 receives a portion of the base portion 28 in a groove 30 formed between an inner wall 32 and an outer wall 34. The connector cap portion 26 is attached to the base portion 28 via one or more tabs 36. The one or more tabs 36 are aligned with the outer wall 34 and extend toward the base portion 28 where each is engaged with a respective retaining barb 38 located on the outer surface of the base portion 28.

Figure 6:
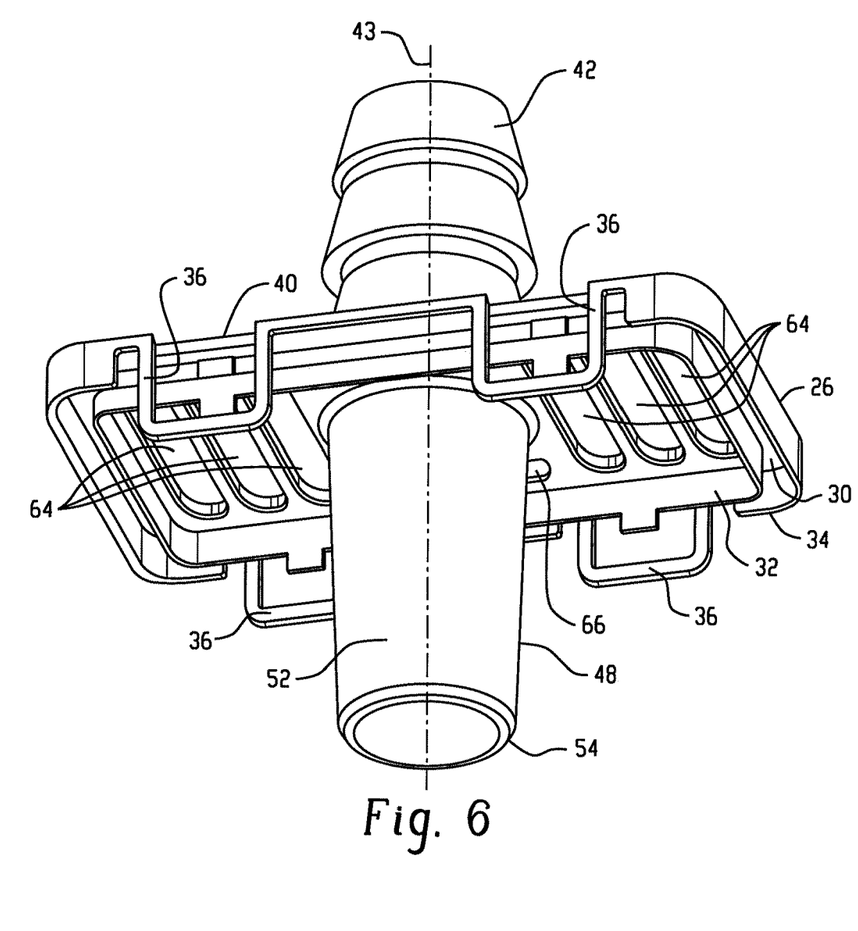
FIG. 6 is a perspective view of an embodiment of a connector cap portion of the filter assembly of FIG. 3.
Figure 7:
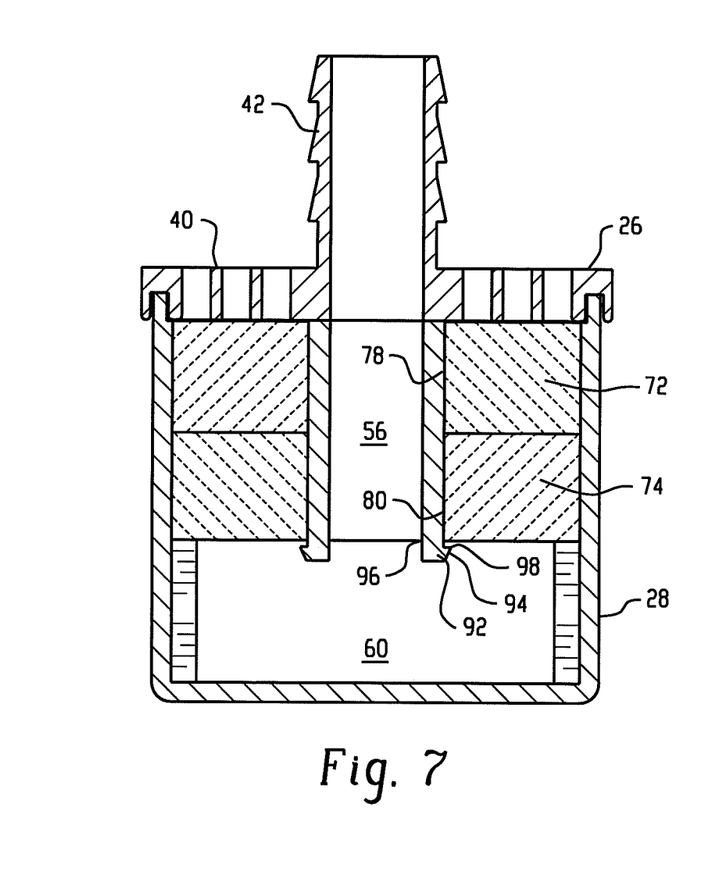
FIG. 7 is a cross-sectional view of another embodiment of the filter assembly.
Figure 8:
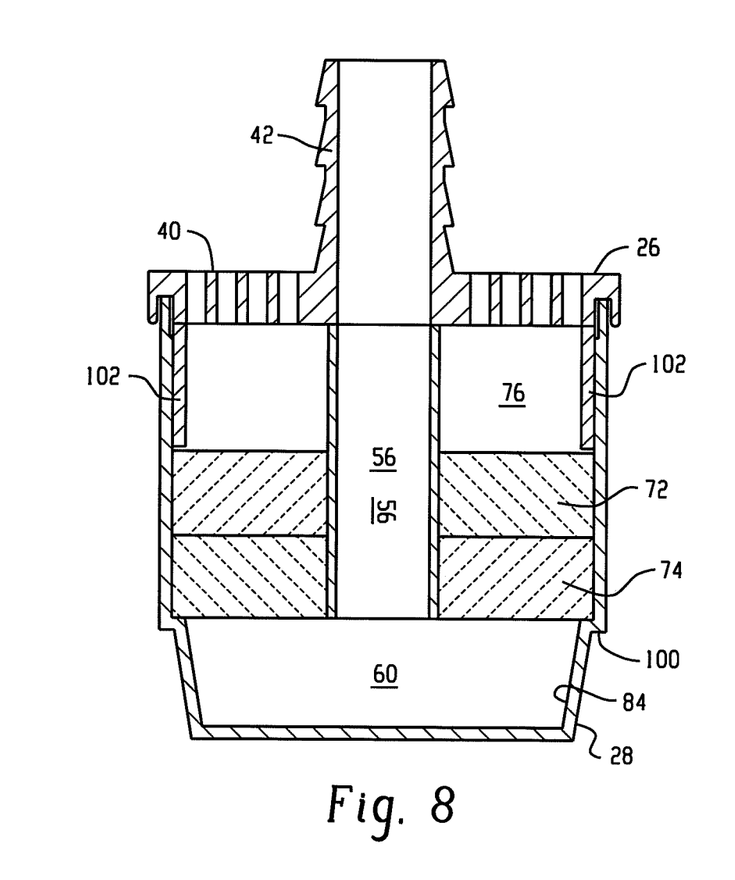
FIG. 8 is a cross-sectional view of yet another embodiment of the filter assembly.

The connector cap portion 26 comprises a cap 40. The cap 40 may be formed in a unitary manner with a barbed tube 42. The barbed tube 42 may be of a generally cylindrical shape. The barbed tube 42 extends through and from the cap 40. Preferably, the barbed tube 42 has a centerline 43 which is aligned with a centerline of the housing 24. In this embodiment, the barbed tube 42 extends through a center portion of the cap 40. A barbed portion 44 of the barbed tube 42 extends from the cap 40 toward a connecting portion 46 of the fresh air line 14, which is illustrated best in FIG. 2, and a cylindrically-shaped portion 48 of the barbed tube 42 extends from the cap 40 in an opposite direction and into the housing 24. The barbed portion 44 comprises one or more annular upsets or barbs 50. As illustrated best in FIG. 2, the fresh air line 14 is secured to filter assembly by disposing the connecting portion 46 over one or more of the barbs 50. Referring now to FIG. 6, the cylindrically-shaped portion 48 includes a first portion 52, which has a substantially constant outer diameter. The cylindrically-shaped portion 48 may also include a second portion 54 which has an outer diameter that gradually reduces toward an end of the cylindrically-shaped portion 48.

Figure 5:
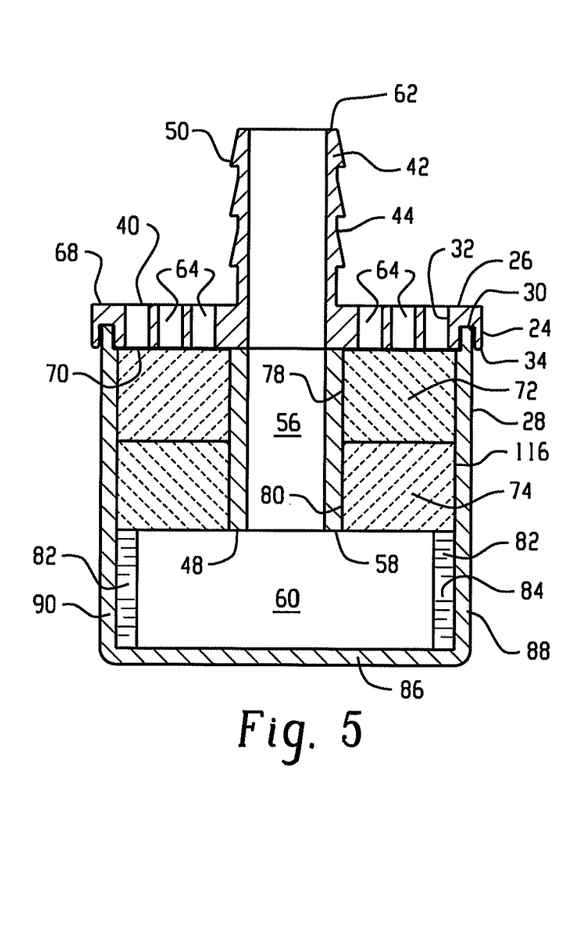
FIG. 5 is a cross-sectional view of the filter assembly of FIG. 4 taken along line 5-5.

As illustrated in FIG. 5, a conduit 56 is provided through the barbed portion 44 and the cylindrically-shaped portion 48 to allow filtered air to flow from the filter assembly 10 to the fresh air line 14. In an embodiment, the conduit 56 has a diameter that is substantially constant. On an end 58, the conduit 56 communicates with a space 60 containing filtered air, which is located within the housing 24. On an opposite end 62, the conduit 56 is in fluid communication with the fresh air line 14.

The cap 40 may be of a generally rectangular shape. Referring now to FIGS. 5-6, the cap 40 comprises a plurality of openings 64, 66 formed therein. Each opening 64, 66 extends from an outer surface 68 to an inner surface 70 of the cap 40. The openings 64, 66 allow air to flow into the housing 24. However, the openings 64, 66 are sized to prevent large debris from entering the housing 24. In an embodiment, the openings 64, 66 may be of a generally rectangular shape or a generally circular shape. However, it should be appreciated that the openings may be of another shape. For example, in an embodiment (not depicted), openings of a generally ovular shape or another shape may be formed in the cap.

The generally rectangular-shaped openings 64 are in a spaced apart and parallel relationship with each other. In an embodiment, the rectangular-shaped openings 64 are provided in a grid-like arrangement. Preferably, each of the rectangular-shaped openings 64 is sized to prevent arachnids and/or insects from entering and colonizing the housing 24. In one such embodiment, each of the rectangular-shaped openings 64 has a width of 3.2 millimeters or less. Furthermore, one or more rectangular-shaped openings may be separated from one or more rectangular-shaped openings by the barbed tube 42. In an embodiment, six rectangular-shaped openings 64 are formed in the cap 40. In this embodiment, three rectangular-shaped openings 64 are provided on opposite sides of the barbed tube 42.

Figure 4:
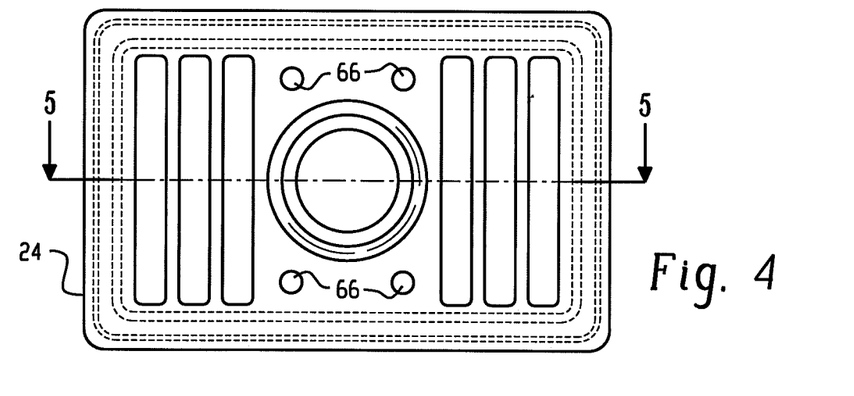
FIG. 4 is a top view of the filter assembly of FIG. 3.

As best illustrated in FIG. 4, the generally circular-shaped openings 66 are in a spaced apart and parallel relationship with each other. Preferably, each of the circular-shaped openings 66 is sized to prevent arachnids and/or insects from entering and colonizing the housing 24. In one such embodiment, each of the circular-shaped openings 66 has a diameter of 3.2 millimeters or less. Furthermore, one or more circular-shaped openings 66 may be separated from one or more circular-shaped openings 66 by the barbed tube 42. In an embodiment, four circular-shaped openings 66 are formed in the cap 40.

Referring back to FIG. 5, the filter assembly 10 comprises one of more filters 72, 74. Preferably, the filter assembly 10 comprises a first filter 72 and a second filter 74. The filters 72, 74 are disposed within the housing 24 and each may be of a substantially rectangular shape.

The first filter 72 is utilized to remove dust and debris from the flow of air utilized to purge the vapor storage canister. Preferably, the first filter 72 is made from a porous material such as, for example, polyurethane foam. In this embodiment, the first filter 72 may comprise about twenty-five pores per inch (ppi). In an embodiment, the first filter 72 is positioned between the second filter 74 and the cap 40. In an embodiment, like the one illustrated in FIG. 5, the first filter 72 abuts the connector cap portion 26. More particularly, in this embodiment, the first filter 72 abuts the inner wall 32. In other embodiments, like the one illustrated in FIG. 8, the first filter 72 is separated from the cap 40 by a space 76.

The second filter 74 is utilized to remove water vapor from the flow of air utilized to purge the vapor storage canister. The second filter 74 abuts the first filter 72 and is thicker than the first filter 72. Preferably, the second filter 74 is made from a porous material such as, for example, polyurethane foam. In this embodiment, the first filter 72 may comprise about sixty pores per inch (ppi). Thus, the second filter 74 is more porous than the first filter 72.

The first filter 72 and the second filter 74 are each connected to the connector cap portion 26. More particularly, the filters 72, 74 are connected to the cylindrically-shaped portion 48. To connect the filters 72, 74 to the cylindrically-shaped portion 48, each filter 72, 74 has a hole 78, 80. As illustrated best in FIG. 3, each hole 78, 80 is formed at or near the center of each respective filter 72, 74. The holes 78, 80 allows the cylindrically-shaped portion 48 to receive each filter 72, 74 when the filter assembly 10 is being formed. In an embodiment, each hole 78, 80 has a diameter and the diameters of the holes 78, 80 are equal to each other.

Preferably, the position of each filter 72, 74 is fixed relative to the connector cap portion 26. The position of each filter 72, 74 can be fixed using a number of methods. In an embodiment, like the one illustrated in FIG. 5, one or more ribs 82 may be formed on an inner surface 84 of the base portion 28. The one or more ribs 82 extend from an end wall 86 toward the second filter 74 and contact the second filter to maintain the position of the filters 72, 74 relative to the connector cap portion 26. In this embodiment, two ribs 82 may be provided and each rib may be disposed on a sidewall 88, 90 of the base portion 28. In another embodiment, like the one illustrated in FIG. 7, the position of the filters 72, 74 can be maintained relative to the connector cap portion 26 by providing an annular shoulder 92 on the end 96 of the cylindrically-shaped portion 48. In this embodiment, an outer surface 94 of the shoulder 92 is tapered toward the end 96 so that the filters 72, 74 can be positioned around the cylindrically-shaped portion 48 when the assembly is being formed. However, the shoulder 92 has an outer diameter 98 which is greater than the diameter of the hole 80 formed in the second filter 74. Thus, once the assembly 10 is formed, the position of the filters 72, 74 is maintained relative to the connector cap portion 26 by the interference of the shoulder 92. In yet another embodiment, like the one illustrated in FIG. 8, the second filter abuts a shoulder 100, which is formed as a portion of the inner surface 84 of the base portion 28. In this embodiment, the filter assembly 10 also comprises a pair of spaced apart arms 102 extending from an inner surface of the connector cap portion 26. The arms 102 are provided in a parallel relationship with each other and extend from the cap 40 toward the first filter 72. In this embodiment, the shoulder 100 and arms 102 maintain the position of the filters 72, 74 relative to the connector cap portion 26.

Figure 3:
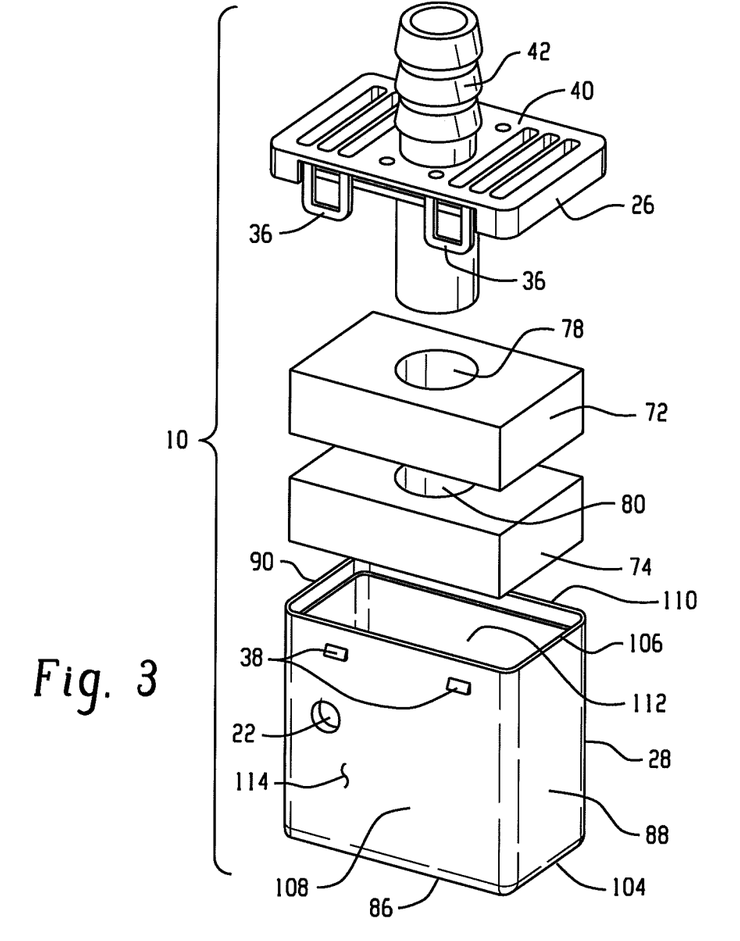
FIG. 3 is an exploded view of an embodiment of the filter assembly.

As illustrated in FIG. 3, the base portion 28 is a hollow member and comprises a closed end 104 and an open end 106. The open end 106 receives the flow of air through the openings 64, 66 in the cap 40. The end wall 86 defines the closed end 104 First, second, third and fourth sidewalls 88, 90, 108, 110 are attached to the end wall 86. A cavity 112 is defined between the walls 86, 88, 90, 108, 110 for receiving other portions 46, 72, 74 of the filter assembly 10. The base portion 28 is attached to the connector cap portion 26 adjacent the open end 106. As noted above, the connector cap portion 26 is attached to the base portion 28 via a snap connection between the one or more tabs 36 and one or more corresponding retaining barbs 38. One or more of the respective retaining barbs 38 are formed on an outer surface 114 of the first sidewall 108. Also, one or more of the respective retaining barbs 38 are formed on an outer surface of the third sidewall 110.

Figure 9:
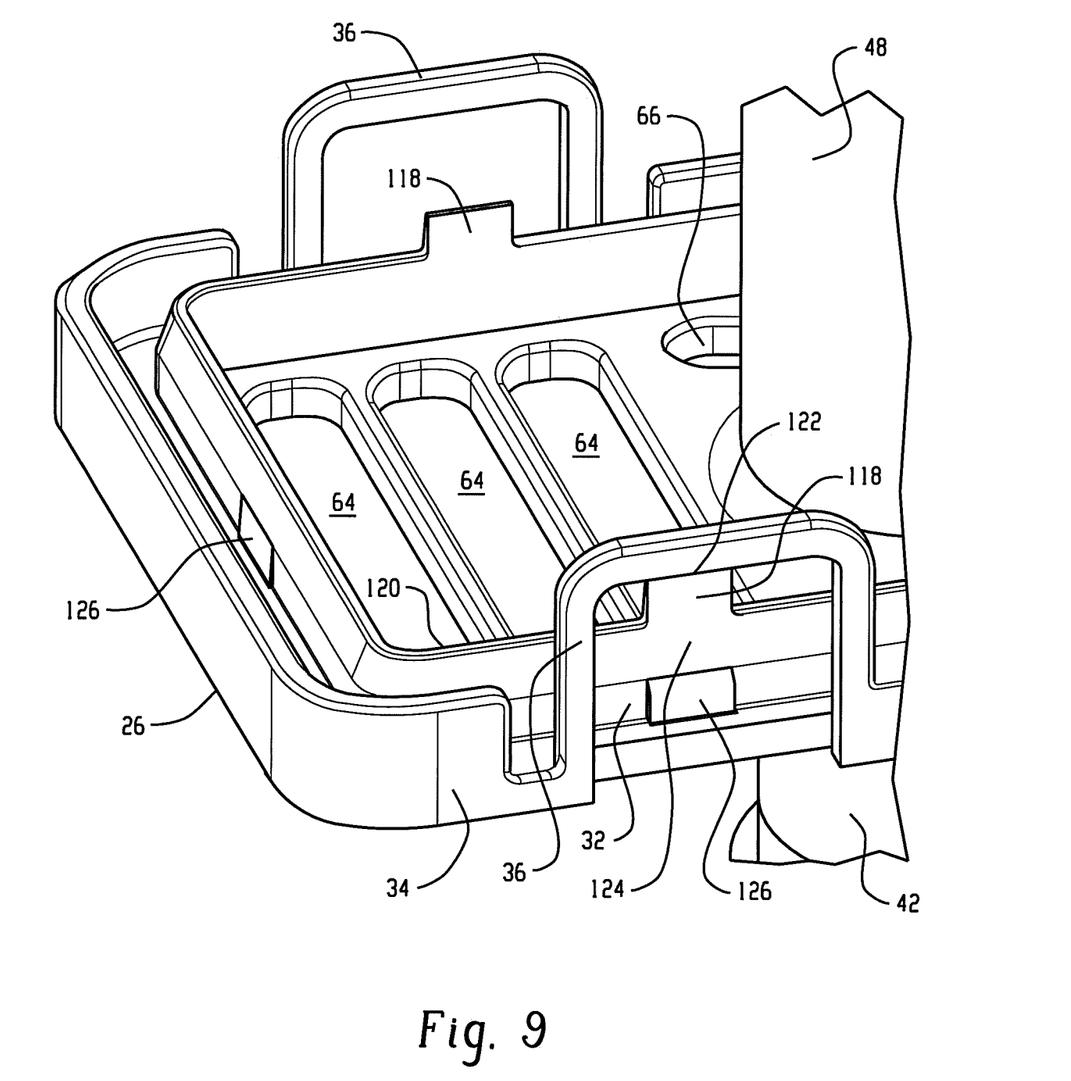
FIG. 9 is an enlarged view of a portion of the connector cap portion of FIG. 6.

As shown best in FIG. 9, one or more outer guide members 118 may be attached to the inner wall 32. As illustrated, the outer guide members 118 may be formed in a unitary manner with and extend beyond a first end 120 of the inner wall 32. Each outer guide member 118 is tapered toward a first end 122 of the guide member 118. The one or more outer guide members 118 are provided to assist in connecting the connector cap portion 26 and the base portion 28 when the filter assembly 10 is being formed. In the embodiments illustrated, four outer guide members 118 are provided. Furthermore, the inner wall 32 may comprise a tapered portion 124 to further assist in connecting the connector cap portion 26 and the base portion 28. The tapered portion 124 extends around the inner wall 32 in a circumferential direction. The tapered portion 124 tapers toward the first end 120 of the inner wall 32. The taper of the outer guide members 118 is aligned with the taper of the tapered portion 124 of the inner wall 32. One or more inner guide members 126 may be attached to the inner wall 32. As illustrated, the inner guide members 126 may be formed in a unitary manner with the inner wall 32. Each inner guide member 126 is tapered toward the taper portion 124 of the inner wall 32. The inner guide members 126 are positioned in the groove 30 and urge the retaining barbs 38 of the base portion toward the tabs 36 of the connector cap portion 26 when the filter assembly 10 is being formed to aid the snap connection therebetween. The taper of the inner guide members 126 is aligned with the tapers of the outer guide members 118 and the tapered portion 124 of the inner wall 32. In the embodiments illustrated, six inner guide members 126 are provided. It should also be noted that an inner guide member 126 is aligned with each outer guide member 118.

Referring back to FIG. 5, when the connector cap portion 26 and the base portion 28 are attached together, the connector cap portion 26 and the base portion 28 define a chamber 116. The chamber 116 is in fluid communication with the atmosphere via the openings 64, 66 formed in the cap 40. The filters 72, 74 are housed in the chamber 116. The flow of air utilized to purge the vapor storage canister is directed into the chamber 116 through the openings 64, 66 in the cap 40 and is then filtered to remove dirt, debris, and moisture. From the filters 72, 74, the flow of air is directed into the space 60 provided between the end wall 86 and the second filter 74. From the space 60, the flow of air is directed through the conduit 56 provided through the barbed tube 42 to the fresh air line 12 and the vapor storage canister. Thus, because the barbed tube 42 extends through the cap 40, the flow of air through the barbed tube 42 is in a direction which is directly opposed to a direction of air flow into the housing 24 through the openings 64, 66 in the cap 40.

From the foregoing detailed description, it will be apparent that various modifications, additions, and other alternative embodiments are possible without departing from the true scope and spirit. The embodiments discussed herein were chosen and described to provide the best illustration of the principles of the present disclosure and its practical application to thereby enable one of ordinary skill in the art to use the present disclosure in various embodiments and with various modifications as are suited to the particular use contemplated. As should be appreciated, all such modifications and variations are within the scope of the present disclosure.

The invention claimed is:

1. A filter assembly comprising a filter housing and at least one filter element supported within the housing, the housing having at least one inlet for receiving a fluid to be filtered and at least one outlet for discharging filtered fluid, wherein the at least one inlet and at least one outlet are on a common side of the housing;
   wherein the housing includes a base portion and a connector cap portion releasably coupled to the base portion, the base portion and the connector cap portion defining a chamber;
   wherein the connector cap portion has a central passageway including a cylindrically-shaped portion extending into the chamber, and a plurality of openings adjacent the central passageway, and wherein the at least one filter element is supported in the chamber such that fluid flows from the plurality of openings to the central passageway via the at least one filter element;
   wherein the at least one filter element is at least partially supported on the cylindrically-shaped portion of the connector cap portion; and
   whereby fluid is drawn into the chamber via the plurality of openings and passes through the at least one filter element before being discharged from the chamber via the central passageway.

2. The filter assembly of claim 1, further comprising a second filter element at least partially supported on the cylindrically-shaped portion of the connector cap portion, whereby fluid is drawn into the chamber via the plurality of openings and passes through the first and second filter elements before being discharged from the chamber via the central passageway.

3. The filter assembly of claim 2, wherein the connector cap portion includes at least one tab configured to cooperate with at least one corresponding retaining barb of the base portion for securing the connector cap portion to the base portion.

4. The filter assembly of claim 3, wherein the first and second filter elements are spaced apart from a bottom of the base portion.

5. The filter assembly of claim 4, wherein the first and second filter elements are coextensive with the cylindrically-shaped portion of the connector cap portion.

6. The filter assembly of claim 5, wherein the first filter element has twenty-five pores per inch and the second filter element has sixty pores per inch.

7. The filter assembly of claim 6, wherein the plurality of openings includes at least one rectangular-shape opening and at least one circular-shape opening.

8. The filter assembly of claim 7, wherein the position of the first and second filter elements is fixed relative to the connector cap portion by one or more ribs formed on an inner surface of the base portion.

9. A fresh air filtration system comprising a filter assembly as set forth in claim 1, and a fresh air line coupled to the filter assembly for supplying filtered air to an associated component.

10. A method of filtering fresh air comprising:
   providing filter assembly including a filter housing and at least one filter element supported within the housing, the housing having at least one inlet for receiving air to be filtered and at least one outlet for discharging filtered air, wherein the at least one inlet and at least one outlet are on a common side of the housing; and
   causing air to flow between the inlet and the outlet through the at least one filter element;
   whereby air exiting the outlet is filtered;
   wherein the housing includes a base portion and a connector cap portion releasably coupled to the base portion, the base portion and the connector cap portion defining a chamber;
   wherein the connector cap portion has a central passageway including a cylindrically-shaped portion extending into the chamber, and a plurality of openings adjacent the central passageway, and wherein the at least one filter element is supported in the chamber such that fluid flows from the plurality of openings to the central passageway via the at least one filter element;
   wherein the at least one filter element is at least partially supported on the cylindrically-shaped portion of the connector cap portion; and
   whereby fluid is drawn into the chamber via the plurality of openings and passes through the at least one filter element before being discharged from the chamber via the central passageway.

11. The method of claim 10, further comprising providing a second filter element at least partially supported on the cylindrically-shaped portion of the connector cap portion, whereby air is drawn into the chamber via the plurality of openings and passes through the first and second filter elements before being discharged from the chamber via the central passageway.

12. The method of claim 11, wherein the connector cap portion includes at least one tab configured to cooperate with at least one corresponding retaining barb of the base portion for securing the connector cap portion to the base portion.

13. The method of claim 12, wherein the first and second filter elements are spaced apart from a bottom of the base portion.

14. The method of claim 13, wherein the first and second filter elements are coextensive with the cylindrically-shaped portion of the connector cap portion.

* * * * *